(12) United States Patent
Lin (10) Patent No.: US 8,724,030 B1
(45) Date of Patent: May 13, 2014

(54) IMAGE PROCESSING APPARATUS AND METHOD THEREOF

(71) Applicant: Novatek Microelectronics Corp., HsinChu (TW)

(72) Inventor: Yu-Mao Lin, Tainan (TW)

(73) Assignee: Novatek Mircoelectronics Corp., Hsinchu (TW)

( * ) Notice: Subject to any disclaimer, the term of this patent is extended or adjusted under 35 U.S.C. 154(b) by 0 days.

(21) Appl. No.: 13/866,605

(22) Filed: Apr. 19, 2013

(30) Foreign Application Priority Data

Dec. 7, 2012 (TW) .............................. 101146205 A (51) Int. Cl.
*H04N 5/21* (2006.01)
*G06K 9/46* (2006.01)
*H04N 9/64* (2006.01)
*H04N 5/14* (2006.01)
*H04N 5/208* (2006.01)

(52) U.S. Cl.
CPC ............... *H04N 9/646* (2013.01); *H04N 5/142* (2013.01); *H04N 5/208* (2013.01); *G06K 9/4604* (2013.01); *H04N 5/21* (2013.01)
USPC ............................ 348/630; 348/625; 382/266

(58) Field of Classification Search
CPC ......... H04N 5/21; H04N 5/208; H04N 5/142; H04N 9/68; H04N 9/646; H04N 9/64; G06K 9/46; G06K 9/4604
USPC ........................... 348/625–631; 382/266–269
See application file for complete search history.

(56) References Cited

U.S. PATENT DOCUMENTS

| 2005/0168644 | A1* | 8/2005 | Demas et al. ................. 348/630 |
| 2008/0310749 | A1* | 12/2008 | Liao et al. ..................... 382/260 |
| 2009/0073319 | A1* | 3/2009 | Neuman et al. ............... 348/668 |

* cited by examiner

*Primary Examiner* — Michael Lee
(74) *Attorney, Agent, or Firm* — Rabin & Berdo, P.C.

(57) ABSTRACT

An image processing apparatus for sharpening edge boundaries of an image is provided. The image processing apparatus includes a transient improvement (TI) circuit and a color protection circuit. The TI circuit receives multiple original pixel data and performs a TI process on an original target pixel data from the original pixel data to output first and second TI chroma signals corresponding to the original pixel data. The color protection circuit respectively compares the first and second TI chroma signals with first and second original chroma signals of the original pixel data to correspondingly generate a weighting value, and outputs first and second adjusted chroma signals according to the weighting value, the first and second original chroma signals, and the first and second TI chroma signals.

21 Claims, 5 Drawing Sheets

IMAGE PROCESSING APPARATUS AND METHOD THEREOF

This application claims the benefit of Taiwan application Serial No. 101146205, filed Dec. 7, 2012, the subject matter of which is incorporated herein by reference.

BACKGROUND OF THE INVENTION

1. Field of the Invention

The invention relates in general to an image processing apparatus and a method thereof, and more particularly to an image processing apparatus for sharpening edge boundaries of an image and a method thereof.

2. Description of the Related Art

Accompanied with rapid progresses on multimedia applications, requirements on image processing techniques continue to expand. The transient improvement (TI) technique is one of the prevalent image processing techniques. By reducing a transient width of blurred edge boundaries in an original image, the TI technique provides the image with a sharpening effect.

However, the conventional TI technique suffers from an issue of not being able to correctly reinforce a chroma value of pixels. For example, in a YCbCr color space, when chroma signals Cb and Cr of a pixel data become color hue distorted after a TI process, an erroneous color block may be caused at an edge boundary of a TI image to degrade image quality.

Therefore, there is a need for an image processing technique capable of enhancing a correctness of the TI technique, so as to effectively prevent color errors in a sharpened image.

SUMMARY OF THE INVENTION

The invention is directed to an image processing technique for sharpening an edge boundary of an image, so as to effectively prevent color errors in a sharpened image.

According to an aspect of the present invention, an image processing apparatus is provided. The image processing apparatus comprises a transient improvement (TI) circuit and a color protection circuit. The TI circuit receives a plurality of original pixel data including an original target pixel data. Each of the original pixel data includes an original luma signal, a first original chroma signal and a second original chroma signal. The TI circuit performs a TI process on the original target pixel data to output a TI pixel data corresponding to the original target pixel data. The TI pixel data includes a TI luma signal, a first TI chroma signal and a second TI chroma signal. The color protection circuit compares the first TI chroma signal with each of the first original chroma signals of the original pixel data, and compares the second TI chroma signal with each of the second original chroma signals of the original pixel data to correspondingly generate a weighting value. The color protection circuit further outputs a first adjusted chroma signal and a second adjusted chroma signal according to the weighting value, the first original chroma signal, the second original chroma signal, the first TI chroma signal and the second TI chroma signal.

According to another aspect of the present invention, an image processing method for an image processing apparatus is provided. The image processing method includes the following steps. A plurality of original pixel data are received. The original pixel data include an original target pixel data, each including an original luma signal, a first original chroma signal and a second original chroma signal. A TI process is performed on the original target pixel data to output a TI pixel data corresponding to the original pixel data. The TI data includes a TI luma signal, a first TI chroma signal and a second TI chroma signal. The first TI chroma data is compared with each of the first original chroma signals of the original pixel data, and the second TI chroma signal is compared with each of the second original chroma signals of the original pixel data to correspondingly generate a weighting value. A first adjusted chroma signal and a second adjusted chroma signal are outputted according to the weighting value, the first original chroma signal, the second original chroma signal, the first TI chroma signal and the second TI chroma signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
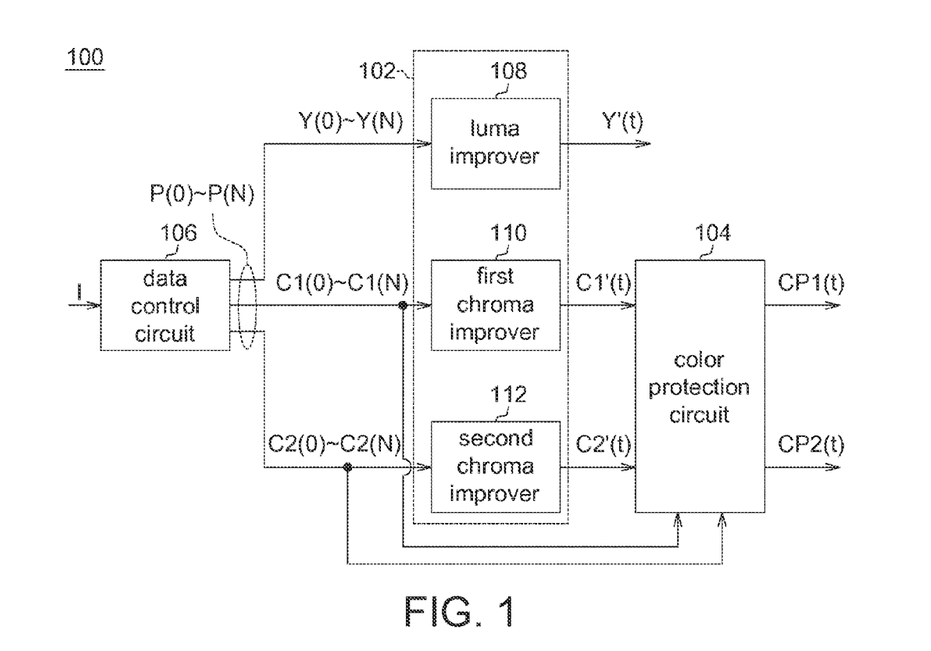
FIG. 1 is a block diagram of an image processing apparatus according to an embodiment of the present invention.
Figure 2:
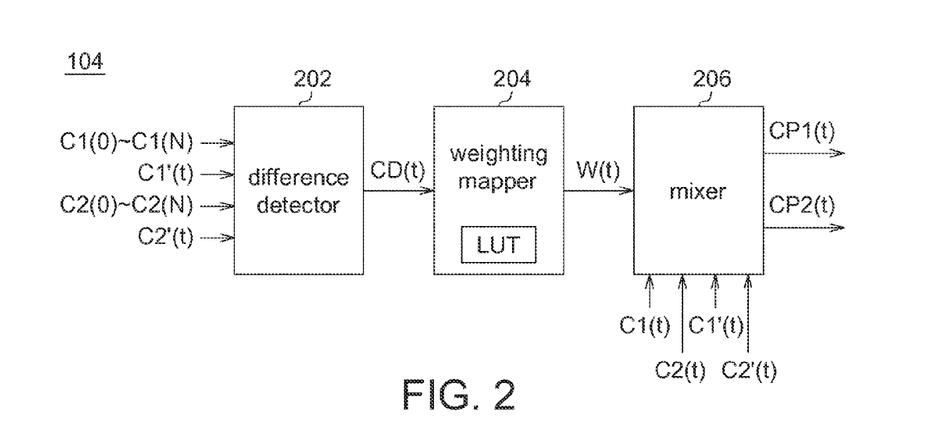
FIG. 2 is a block diagram of an exemplary color protection circuit according to an embodiment.

FIG. 1 shows a block diagram of an image processing apparatus 100 according to an embodiment of the present invention. FIG. 2 shows a block diagram of an exemplary color protection circuit 104 in the image processing circuit 100 in FIG. 1. The image processing apparatus 100 comprises a transient improvement (TI) circuit 102 and the color protection circuit 104. The TI circuit 102 receives a plurality of original pixel data P(i), where i is an integer between 0 and a positive integer N. The original pixel data P(0) to P(N) include an original target pixel P(t), where t is an integer between 0 and N. Each of the original pixel data includes an original luma signal Y(i), a first original chroma signal C1(i) and a second original chroma signal C2(i). The TI circuit 102 performs a TI process on the original target pixel data P(t) to output a TI pixel data corresponding to the original target pixel data P(t). The TI pixel data includes a TI luma signal Y'(t), a first TI chroma signal C1'(t) and a second TI chroma signal C2'(t).

For example, the TI circuit 102 receives original pixel data P(0) to P(30), with an original pixel data P(15) being the original target pixel data, and the original pixel data P(0) to P(30) respectively corresponding to original luma signals Y(0) to Y(30), first original chroma signals C1(0) to C1(30) and second original chroma signals C2(0) to C2(30). After receiving the original pixel data P(0) to P(30), the TI circuit 102 performs a TI process on the original target pixel data P(15) to output a TI luma signal Y'(15), a first TI chroma signal C1'(15) and a second chroma signal C2'(15) corresponding to the original target pixel data P(15).

A color space of the above original pixel data P may be a YCbCr color space or a YUV color space. In an example, when the color space of the original pixel data P is YCbCr, the original luma signal Y(i), the first original chroma signal C1(i) and the second original chroma signal C2(i) in each of the original pixel data respectively correspond to the luma component Y, the chroma component Cb and the chroma component Cr in the YCbCr color space. Further, for example, the original target pixel data corresponds to a target pixel of a display panel.

The color protection circuit 104 compares the first TI chroma signal C1'(t) with each of the first original chroma signals C1(0) to C1(N) of the original pixel data P(0) to P(N), and compares the second TI chroma signal C2'(t) with each of the second original chroma signals C2(0) to C2(N) of the original pixel data P(0) to P(N) to correspondingly generate a weighting value W. According to the weighting value W, and the first original chroma signal C1(t), the second original chroma signal C2(t), the first TI chroma signal C1'(t) and the second TI chroma signal C2'(t) corresponding to the original target pixel data P(t), the color protection circuit 104 further outputs a first adjusted chroma signal CP1(t) and a second adjusted chroma signal CP2(t). For example, the color protection circuit 104 respectively compares the first TI chroma signal C1'(15) and the second TI chroma signal C2'(15) corresponding to the original target pixel data P(15) with the first original chroma signals C1(0) to C1(30) and the second original chroma signals C2(0) to C2(30) to correspondingly generate the weighting value W. The weighting value W indicates a reliability level of a signal. As the reliability level of a signal gets higher, the signal and a final signal outputted are more similar. For example, as the weighting value W corresponding to the first TI chroma signal C1'(t) gets larger and thus indicating a higher reliability level, a ratio of the first TI chroma signal C1'(t) constituting the first adjusted chroma signal CP1(t) becomes greater, such that the first TI chroma signal C1'(t) and the first adjusted chroma signal CP1(t) appear more similar. It should be noted that, the above example is for explaining the embodiment of the present invention; given that the weighting value reflects a reliability level or an unreliability level of a signal, the weighting value W is not necessarily directly proportional to a ratio of the signal constituting the output signal.

The image processing apparatus 100 may further include a data control circuit 106 for fetching pixel data of a window region of an image data I to serve as the original pixel data P(0) to P(N) to be outputted to the TI circuit 102 and the color protection circuit 104. In the embodiment, an example of outputting the original pixel data P(0) to P(N) to the TI circuit 102 and outputting the first and second original chroma signals C1(0) to C1(N) and C2(0) to C2(N) of the original pixel data P(0) to P(N) to the color protection circuit 104 is described. The window region may be defined according to the target pixel corresponding to the original target pixel data. For example, assuming that the target pixel is P(15), the window region may be defined as a pixel region formed by respectively extending 15 pixels to the left and right of the target pixel P(15) regarded as a center. In such a case, the window region is a pixel row in a size 1×31 pixels, which include pixels P(0) to P(30), for example. In another embodiment, the window region may also be a pixel row in a fixed size. The data control circuit 106 further outputs the original pixel data P(0) to P(30) corresponding to the pixels P(0) to P(30) to the TI circuit 102 and the color protection circuit 104.

The window region may be defined according to other definitions, and is not limited to the above example. The size of the window region may also be adjusted according to a resolution of a display device. For example, the corresponding window region gets larger as the resolution of the display device gets higher, or gets smaller as the resolution of the display device gets smaller.

The TI circuit 102 may include a luma improver 108, a first chroma improver 110 and a second chroma improver 112. The luma improver 108 performs a TI process on the original luma signal Y(t) to output the TI luma signal Y'(t), which corresponds to the luma component Y in the YCbCr color space, for example. The first chroma improver 110 performs a TI process on the first original chroma signal C1(t) to output the first TI chroma signal C1'(t) to the color protection circuit 104. The second chroma improver 112 performs a TI process on the second original chroma signal C2(t) to output the second TI chroma signal C2'(t) to the color protection circuit 104. For example, the first and second TI chroma signals C1' and C2' respectively correspond to the chroma components Cb and Cr in the YCbCr color space.

Figure 3:
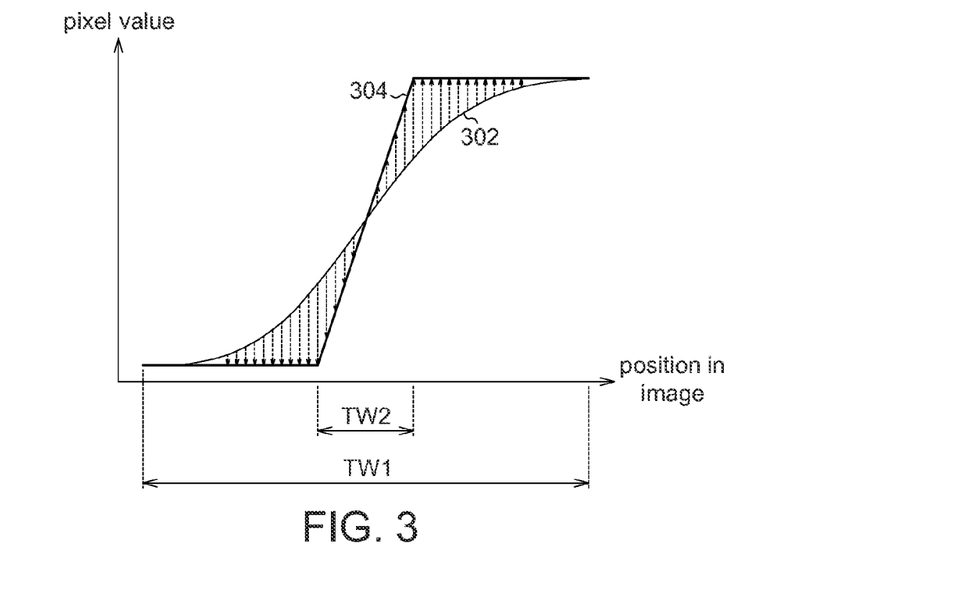
FIG. 3 is a schematic diagram of a transient improvement (TI) process.

FIG. 3 shows a schematic diagram of the above TI process. A curve 302 represents a curve of pixel values corresponding to a plurality of original pixel data (to be referred to as original pixel values) changing with an image position. A curve 304 represents a curve of pixel values corresponding to a plurality of TI pixel data (to be referred to as TI pixel values) changing with an image position. For example, the pixel value is the luma component Y, the chroma component Cb or the chroma component Cr, and the image position is a pixel position arranged along a predetermined direction. From changes in the curve 302, it is observed that, at image edge boundaries, the original pixel values have a greater transient width TW1 as the image position changes moderately, leading to blurred edge boundaries in the visual perception. The TI process adjusts the original pixel values at the image edge boundaries (e.g., adjusting the original pixel values along directions indicated by dotted arrows). The adjusted original pixel values, i.e., the TI pixel values, are as shown by the curve 304. The TI pixel values along with changes in the image position have a smaller transient width TW2, and thus render a sharpened edge boundary effect in the visual perception.

Again referring to FIGS. 1 and 2, the color protection circuit 104 may include a difference detector 202, a weighting mapper 204 and a mixer 206. The difference detector 202 detects a plurality of differences between the first TI chroma signal C1'(t) and the first original chroma signals C1(0) to C1(N) of the original pixel data P(0) to P(N), and between the second TI chroma signal C2'(t) and the second original chroma signals C2(0) and C2(N) of the original pixel data P(0) to P(N), respectively, and outputs a color difference signal CD(t) according to the differences.

The weighting mapper 204 looks up a weighting look-up table (LUT) according to the color difference signal CD(t) to output the weighting value W(t). For example, the weighting LUT includes information of different color difference signals CD(t) and the corresponding weighting values W(t), so as to allow the weighting mapper 204 to output the weighting value W(t) corresponding to the color difference signal CD(t) by use of the weighting LUT. Given that the weighting mapper 204 generates the weighting value W(t) corresponding to the color difference signal CD(t), the weighting mapper 204 in an alternative embodiment may obtain the weighting value W(t) through other means apart from looking up the LUT as in the above example.

The mixer 206 receives the weighting value W(t), the first original chroma signal C1(t) of the original target pixel data P(t), the second original chroma signal C2(t) of the original target pixel data P(t), the first TI chroma signal C1'(t) corresponding to the original target pixel data P(t), and the second TI chroma signal C2'(t) corresponding to the original target pixel data P(t). The mixer 206 further mixes the first original chroma signal C1(t) of the original target pixel data P(t) and the first TI chroma signal C1'(t) corresponding to the original target pixel data P(t) to output the first adjusted chroma signal CP1(t), and mixes the second original chroma signal C2(t) of the original target pixel data P(t) and the second TI chroma signal C1'(t) corresponding to the original target pixel data P(t) to output the second adjusted chroma signal CP2(t). The above signal mixing process can be obtained as:

$$S=S1(\alpha)+S2(1-\alpha)$$

In the above equation, S represents a mixed signal, S1 and S2 respectively represent signals to be mixed, and α represents a weighting of a signal to be mixed. For example, S represents the first adjusted chroma signal CP1(t), S1 represents the first original chroma signal C1(t) of the original target pixel data P(t), S2 represents the first TI chroma signal C1'(t) corresponding to the original target pixel data P(t), and α represents the weighting value W(t) corresponding to the first original chroma signal C1(t). In an alternative embodiment, given that the signal outputted by the mixer 206 reflects the reliability level of the weighting value W(t) of a signal to be mixed, the mixer 206 is not limited to mixing the two signals according to the weighting value W(t).

Figure 4:
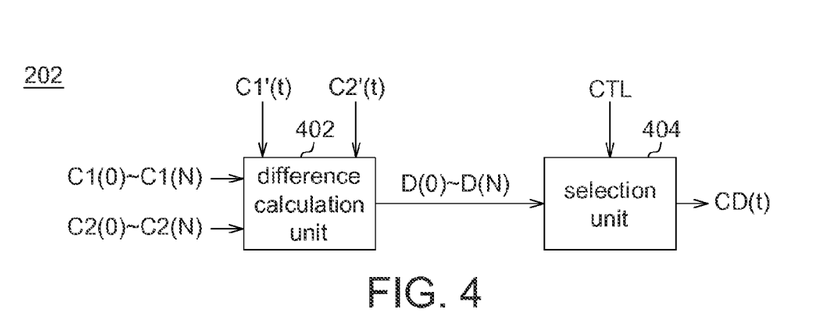
FIG. 4 is a schematic diagram of an exemplary difference detector according to an embodiment.

FIG. 4 shows a schematic diagram of the difference detector 202 in the color protection circuit 104 in FIG. 2. The difference detector 202 includes a difference calculation unit 402 and a selection unit 404. The difference calculation unit 402 subtracts the first TI chroma signal C1'(t) corresponding to the original target pixel data P(t) from each of the first original chroma signals C1(0) to C1(N) of the original pixel data P(0) to P(N), and subtracts the second TI chroma signal C2'(t) corresponding to the original target pixel data P(t) from each of the second original chroma signals C2(0) to C2(N) of the original pixel data P(0) to P(N), to generate differences D(0) to D(N) respectively corresponding to the original target pixel data P(0) to P(N).

A sum of the above subtraction results can be obtained as:

$$D(i)=|\text{diff\_}C1(i)|+|\text{diff\_}C2(i)|.$$

In the above equation, the parameter diff_C1(i) represents the subtraction result of the first TI chroma signal C1'(t) corresponding to the original target pixel data P(t) and the first original chroma signal C1(i) of the original pixel data P(i); the parameter diff_C2(i) represents the subtraction result of the second TI chroma signal C1'(t) corresponding to the original target pixel data P(t) and the second original chroma signal C2(i) of the original pixel data P(i). It should be noted that the details of the above equation are not limited to the examples. Without departing from the spirit of the present invention, modifications can be made given that differences are generated by linear or non-linear combinations of the parameters diff_C1 and diff_C2.

The selection unit 404 selects a minimum from the differences D(0) to D(N) to serve as the color difference signal CD(t). For example, when the difference D(10) is the minimum of the differences D(0) to D(N), the difference D(10) is selected as the color difference signal CD(t). For example, a size of the color difference signal CD(t) may be represented by a quantized color difference value CDiff(t).

The selection unit 404 may further select a part of the differences D(0) to D(N) according to a control signal CTL to serve as samples for determining the minimum. For example, the selection unit 404 selects a part D(10) to D(N−10) from the differences D(0) to D(N) according to the control signal CTL to serve as samples for determining the minimum, and selects a minimum from the differences D(10) to D(N−10) to serve as the color difference signal CD(t). In such a case, the selection unit 404 is not required to compare all of the differences, thereby lowering a computation load as well as reducing production costs of the selection unit 404.

Figure 5:
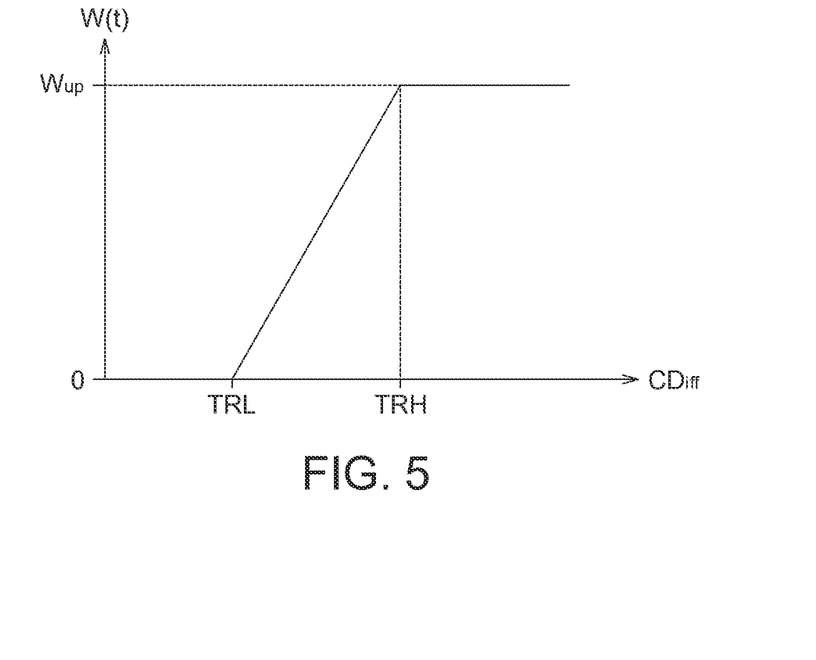
FIG. 5 is a schematic diagram of a corresponding relationship between a weighting value W and a color difference value CDiff corresponding to a color difference signal CD.

FIG. 5 shows a diagram depicting a corresponding relationship between the weighting value W(t) and the color difference value CDiff corresponding to the color difference signal CD. In FIG. 5, when the color difference value CDiff increases from TRL to TRH, the weighting value W(t) linearly increases from 0 to Wup. Rather than increasing linearly, in an alternative embodiment, the weighting value W(t) may also increase non-linearly as the color difference value CDiff changes. Further, the weighting value W(t) is not limited to change only when the color difference value CDiff is located between an interval of [TRL, TRH]. As the color difference value CDiff corresponding to the color difference signal CD gets larger, it means that the differences between first and second original chroma signals C1(t) and C2(t) and the pixel data of the window region are also larger, implying that the TI pixel data is more likely an incorrect color. Under such circumstances, the original target pixel data P(t) is designated with a higher weighting, i.e., a higher reliability level. In contrast, as the color difference value CDiff corresponding to the color difference signal CD(t) gets smaller, it means that the differences between first and second original chroma signals C1(t) and C2(t) and the pixel data of the window region are also smaller, implying that the TI pixel data is more likely correct. Under such circumstances, the original target pixel data P(t) is designated with a smaller weighting, i.e., a lower reliability level.

Figure 6:
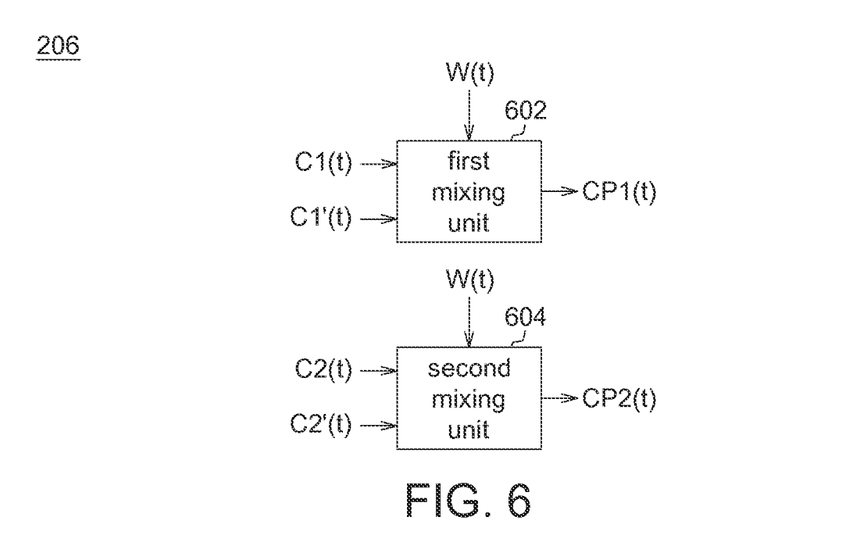
FIG. 6 is a schematic diagram of an exemplary mixer according to an embodiment.

FIG. 6 shows a schematic diagram of an example of the mixer 206 in the color protection circuit 104 in FIG. 2. The mixer 206 includes a first mixing unit 602 and a second mixing unit 604. The first mixing unit 602 mixes the first TI chroma signal C1'(t) corresponding to the original target pixel data P(t) and the first original chroma signal C1(t) of the original target pixel data P(t) to output the first adjusted chroma signal CP1(t). The second mixing unit 604 mixes the second TI chroma signal C2'(t) corresponding to the original target pixel data P(t) and the second original chroma signal C2(t) of the original target pixel data P(t) to output the second adjusted chroma signal CP2(t).

Since the weighting value W(t) indicates the reliability level of a signal, as the color difference value CDiff(t) corresponding to the color difference signal CD(t) gets larger, the weighting value W(t) renders the mixing ratio of the original target pixel data P(t) (e.g., the first or second original chroma signal C1(t) or C2(t) of the original target pixel data P(t)) to be higher as well. In contrast, as the color difference value CDiff(t) corresponding to the color difference signal CD(t) gets smaller, the weighting value W(t) renders the mixing ratio of the TI pixel data (e.g., the first or second TI chroma signal C1'(t) or C2'(t) corresponding to the original target pixel data P(t)) to be higher. As such, in the event of an incorrect color presentation on the original target pixel data P(t) after a TI process, the color protection circuit 104 is able to correspondingly adjust the TI pixel data according to a color deviation level to render the adjusted TI pixel data to be similar to the original target pixel data P(t). Based on the reason that the color of the original target pixel data P(t) is considered correct, the above adjustment process may then prevent the occurrence of an incorrect color.

Figure 7:
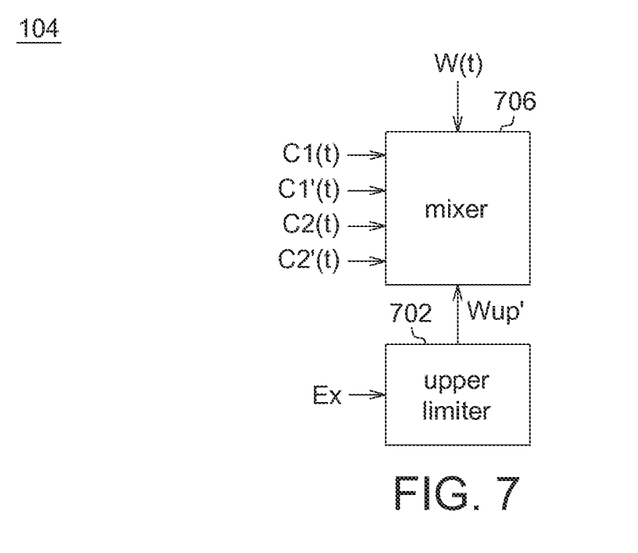
FIG. 7 is a schematic diagram of an exemplary upper limiter according to an embodiment.

Referring to FIG. 7, the color protection circuit 104 according to an embodiment of the present invention further includes an upper limiter 702. The upper limiter 702 is coupled to the mixer 206, and sets an upper limit Wup' of the weighting value W(t) according to an external signal Ex.

Figure 8:
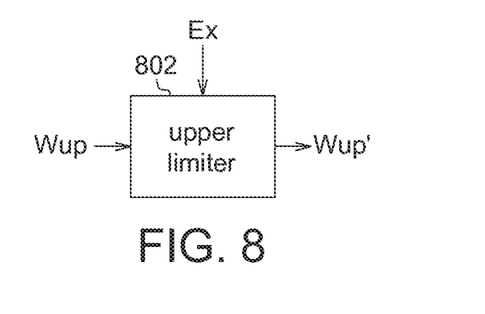
FIG. 8 is a schematic diagram of an exemplary upper limiter according to an embodiment.

FIG. 8 shows a schematic diagram of an example of the upper limiter 702 in FIG. 7. In FIG. 8, after receiving an original upper limit Wup corresponding to the weighting value W(t) and the external signal Ex, an upper limiter 802 selects the smaller between the original upper limit Wup and the external signal Ex as the upper limit Wup' of the weighting value W(t). In one embodiment, the external signal Ex may be the original upper limit Wup subtracted by a setting value Sv. For example, assuming that the original upper limit Wup corresponding to the weighting value W(t) is 1, the external signal Ex is Wup-SV=0.8 when a setting value Sv=0.2 is inputted. The upper limiter 802 selects the smaller between the original upper limit Wup (=1) and the external signal Ex (Wup-Sv=0.8) as the new upper limit Wup' of the weighting value W(t). That is, the upper limit of the weighting value W(t) is reduced from an original value of 1 to a new value of 0.8. It should be noted that the embodiment is not limited to the above example, and a circuit capable of setting the upper limit Wup of the weighting value W(t) according to the external signal Ex can be utilized as the upper limiter 802 of the embodiment.

Figure 9:
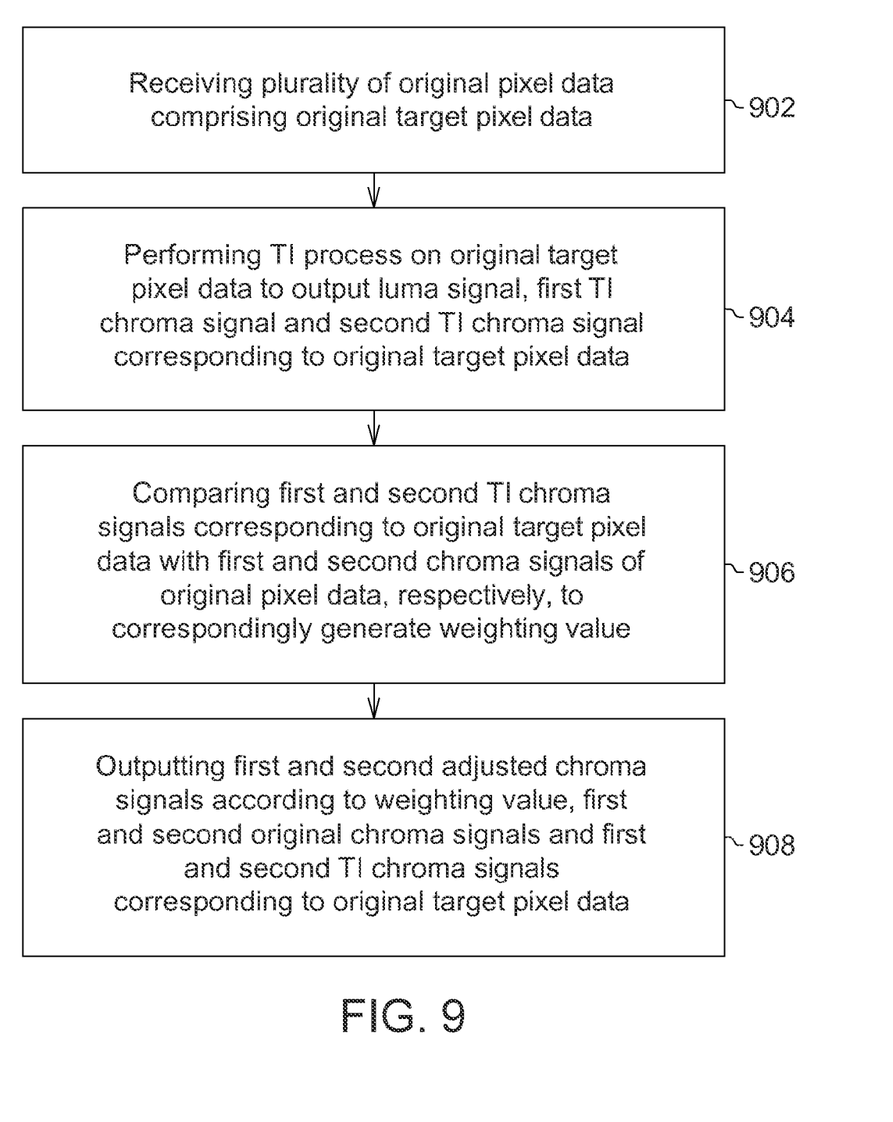
FIG. 9 is a flowchart of an image processing method according to an embodiment.

An image processing method is further provided by an embodiment of the present invention. The image processing method is applicable to the image processing apparatus 100 of the foregoing embodiments. FIG. 9 shows a flowchart of the image processing method according to an embodiment. The method includes steps 902, 904, 906 and 908. In step 902, a plurality of original pixel data P(0) to P(N) are received. The original pixel data P(0) to P(N) include an original target pixel data P(t), and each of the original pixel data P(0) to P(N) includes an original luma signal Y(i), a first chroma signal C1(i) and a second chroma signal C2(i).

In step 904, a TI process is performed on the original target pixel data P(t) to output a TI pixel data corresponding to the original target pixel data P(t). The TI pixel data includes a TI luma signal Y'(t), a first TI chroma signal C1'(t) and a second TI chroma signal C2'(t).

In step 906, the first TI chroma signal C1'(t) corresponding to the original target pixel data P(t) is compared with each of the first original chroma signals C1(0) to C1(N) of the original pixel data P(0) to P(N), and the second TI chroma signal C2'(t) corresponding to the original target pixel data P(t) is compared with each of the second original chroma signals C2(0) to C2(N) of the original pixel data P(0) to P(N), to correspondingly generate a weighting value W(t).

In step 908, according to the weighting value W(t), the first original chroma signal C1(t), the second original chroma signal C2(t), the first TI chroma signal C1'(t) and the second TI chroma signal C2'(t) corresponding to the original target pixel data P(t), a first adjusted chroma signal CP1(t) and a second adjusted chroma signal CP2(t) are outputted.

Therefore, according to the image processing apparatus for sharpening edge boundaries of an image and the method thereof, an issue of an incorrect color suffered in a conventional TI technique can be effectively prevented to enhance the correctness of the TI technique.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, for sharpening an edge boundary of an image, comprising:
    a transient improvement (TI) circuit, for receiving a plurality of original pixel data; wherein the original pixel data include an original target pixel data, and each of the original pixel data includes an original luma signal, a first original chroma signal and a second original chroma signal; the TI circuit further performing a TI process on the original target pixel data to output a TI pixel data corresponding to the original target pixel data; wherein the TI pixel data includes a TI luma signal, a first TI chroma signal and a second TI chroma signal; and
    a color protection circuit, for comparing the first TI chroma signal with each of the first original chroma signals of the original pixel data, and comparing the second TI chroma signal with each of the second original chroma signals of the original pixel data to correspondingly generate a weighting value, and outputting a first adjusted chroma signal and a second adjusted chroma signal according to the weighting value, the first original chroma signal, the second original chroma signal, the first TI chroma signal and the second TI chroma signal.

2. The image processing apparatus according to claim 1, wherein the TI circuit comprises:
    a luma improver, for performing the TI process on the original luma signal of the original target pixel data to output the TI luma signal;
    a first chroma improver, for performing the TI process on the first original chroma signal of the original target pixel data to output the first TI chroma signal to the color protection circuit; and
    a second chroma improver, for performing the TI process on the second original chroma signal of the original target pixel data to output the second TI chroma signal to the color protection circuit.

3. The image processing apparatus according to claim 1, wherein a color space of the original pixel data is a YCbCr color space or a YUV color space.

4. The image processing apparatus according to claim 1, wherein the color protection circuit comprises:
    a difference detector, for detecting a plurality of differences between the first TI chroma signal and the first original chroma signals of the original pixel data, and between the second TI chroma signal and the second original chroma signals of the original pixel data, and outputting a color difference signal according to the differences;
    a weighting mapper, for looking up a weighting table according to the color difference signal to output the weighting value; and
    a mixer, for receiving the weighting value, the first original chroma signal of the original target pixel data, the second original chroma signal of the original target pixel data, the first TI chroma signal and the second TI chroma signal, mixing the first original chroma signal of the original target pixel data and the first TI chroma signal to correspondingly output the first adjusted chroma signal, and mixing the second original chroma signal of the original target pixel data and the second TI chroma signal to correspondingly output the second adjusted chroma signal.

5. The image processing apparatus according to claim 4, wherein the difference detector comprises:
- a difference calculation unit, for respectively subtracting the first TI chroma signal from the first original chroma signals of the original pixel data, respectively subtracting the second TI chroma signal from the second original chroma signals of the original pixel data, and generating the differences respectively corresponding to the original target pixel data according to a sum of the subtraction results corresponding to the original pixel data; and
- a selection unit, for selecting a minimum from the differences to serve as the color difference signal.

6. The image processing apparatus according to claim 4, wherein when a color difference value corresponding to the color difference signal gets larger, the weighting value renders a mixing ratio of the original target pixel data to be higher, and when the color difference value corresponding to the color difference signal gets smaller, the weighting value renders a mixing ratio of the TI pixel data to be higher.

7. The image processing apparatus according to claim 4, wherein the mixer comprises:
- a first mixing unit, for mixing the first TI chroma signal and the first original chroma signal of the original target pixel data to output the first adjusted chroma signal; and
- a second mixing unit, for mixing the second TI chroma signal and the second original chroma signal of the original target pixel data to output the second adjusted chroma signal.

8. The image processing apparatus according to claim 4, wherein the color protection circuit further comprises:
- an upper limiter, coupled to the mixer, for setting an upper limit of the weighting value according to an external signal.

9. The image processing apparatus according to claim 8, wherein the upper limiter receives an original upper limit corresponding to the weighting value and the external signal, and selects a smaller between the original upper limit and the external signal to serve as the upper limit of the weighting value.

10. The image processing apparatus according to claim 1, further comprising:
- a data control circuit, for fetching pixel data of a window region of an image data to serve as the original pixel data, and outing the original pixel data to the TI circuit and the color protection circuit.

11. An image processing method, for sharpening an edge boundary of an image, comprising:
- receiving a plurality of original pixel data; wherein the original pixel data include an original target pixel data, and each of the original pixel data includes an original luma signal, a first original chroma signal and a second original chroma signal;
- performing a TI process on the original target pixel data to output a TI pixel data corresponding to the original target pixel data; wherein the TI pixel data includes a TI luma signal, a first TI chroma signal and a second TI chroma signal;
- comparing the first TI chroma signal with each of the first original chroma signals of the original pixel data, and comparing the second TI chroma signal with each of the second original chroma signals of the original pixel data to correspondingly generate a weighting value; and
- outputting a first adjusted chroma signal and a second adjusted chroma signal according to the weighting value, the first original chroma signal, the second original chroma signal, the first TI chroma signal and the second TI chroma signal.

12. The image processing method according to claim 11, wherein the step of performing the TI process on the original target pixel data comprises:
- performing the TI process on the original luma signal of the original target pixel data to output the TI luma signal;
- performing the TI process on the first original chroma signal of the original target pixel data to output the first TI chroma signal to the color protection circuit; and
- performing the TI process on the second original chroma signal of the original target pixel data to output the second TI chroma signal to the color protection circuit.

13. The image processing method according to claim 11, wherein a color space of the original pixel data is a YCbCr color space or a YUV color space.

14. The image processing method according to claim 11, wherein the step of generating the weighting value comprises:
- detecting a plurality of differences between the first TI chroma signal and the first original chroma signals of the original pixel data, and between the second TI chroma signal and the second original chroma signals of the original pixel data, and outputting a color difference signal according to the differences; and
- looking up a weighting table according to the color difference signal to output the weighting value.

15. The image processing method according to claim 14, wherein the step of outputting the first adjusted chroma signal and the second adjusted chroma signal comprises:
- receiving the weighting value, the first original chroma signal of the original target pixel data, the second original chroma signal of the original target pixel data, the first TI chroma signal and the second TI chroma signal;
- mixing the first original chroma signal of the original target pixel data and the first TI chroma signal to correspondingly output the first adjusted chroma signal; and
- mixing the second original chroma signal of the original target pixel data and the second TI chroma signal to correspondingly output the second adjusted chroma signal.

16. The image processing method according to claim 14, wherein the step of outputting the color difference signal comprises:
- respectively subtracting the first TI chroma signal from the first original chroma signals of the original pixel data, and respectively subtracting the second TI chroma signal from the second original chroma signals of the original pixel data;
- generating the differences respectively corresponding to the original target pixel data according to a sum of the subtraction results corresponding to the original pixel data; and
- selecting a minimum from the differences to serve as the color difference signal.

17. The image processing method according to claim 14, wherein the weighting value renders a mixing ratio of the original pixel data to be higher when a color difference value corresponding to the color difference signal gets larger.

18. The image processing method according to claim 14, wherein the step of outputting the first adjusted chroma signal and the second adjusted chroma signal comprises:
- mixing the first TI chroma signal and the first original chroma signal of the original target pixel data to output the first adjusted chroma signal; and
- mixing the second TI chroma signal and the second original chroma signal of the original target pixel data to output the second adjusted chroma signal.

19. The image processing method according to claim 14, further comprising:

for setting an upper limit of the weighting value according to an external signal.

20. The image processing method according to claim 19, wherein the step of setting the upper limit of the weighting value comprises:

after receiving an original upper limit corresponding to the weighting value and the external signal, selecting a smaller between the original upper limit and the external signal to serve as the upper limit of the weighting value.

21. The image processing method according to claim 11, further comprising:

fetching a pixel data of a window region of an image data to serve as the original pixel data.

* * * * *